Oct. 17, 1967 A. CARMI ET AL 3,347,653

CLAMPING DEVICE

Filed Sept. 4, 1964

INVENTORS
Arieh Carmi
Thomas J. Rayeski

BY

ATTORNEY

United States Patent Office 3,347,653
Patented Oct. 17, 1967

3,347,653
CLAMPING DEVICE
Arieh Carmi and Thomas J. Rayeski, Corning, N.Y., assignors to Corning Glass Works, Corning, N.Y., a corporation of New York
Filed Sept. 4, 1964, Ser. No. 394,460
3 Claims. (Cl. 65—307)

ABSTRACT OF THE DISCLOSURE

A clamping device for restraining relative movement between two members having flat surfaces contacting each other, a first of said members having an orifice extending normal to said surfaces, a flanged sleeve-like piston longitudinally movable therewithin and a fluid conduit leading into said orifice to supply pressurized fluid against the brim of the flange of said piston which is nearest the second of said members; and the second of said members having a bolt secured thereto normal to said surfaces and extending through the hollow of said piston, such bolt being detachably coupled with the end of such piston most remote from said second member.

---

This invention relates to a clamping device or movement restraining apparatus. More particularly the invention relates to a clamping device or motion restraining apparatus which may be used for clamping a machine part in a preset position and which is especially adaptable for use in the restraint of movement of glass forming plungers or molds in a machine of the press mold and plunger type.

In a glass forming machine of the above mentioned type, a glass pressing plunger assembly is commonly secured to a cross-head support by a plurality of hang-up bolts, each of which extends through an orifice in said support and screws into the plunger head of said assembly to firmly hold the plunger of the assembly in a preset alignment with its cooperating press mold. However, due to vibration, intermittent indexing motions, thermal expansion, etc. occurring during the operation of the machine, deviations in said preset alignment of the plunger and mold often occur and, therefore, realignment of such parts is often necessary. Furthermore, replacement of defective parts of the plunger assembly, such as a damaged plunger, is often necessitated. At such time, the hang-up bolts must be unscrewed, at least a partial turn, from the defective assembly, such assembly removed and replaced with a replacement assembly, and the hang-up bolts of the replacement assembly then tightened.

It is, therefore, one object of the present invention to provide a new and improved type of movement restraining apparatus or clamp which may be employed for retaining a machine part in a clamped preset position such as, for example, for the clamping of an article forming pressing plunger in a preset alignment with a cooperating forming mold, but which at the same time may be readily actuated to permit the clamped position of a machine part, such as said pressing plunger, to be readjusted to compensate for deviations from said preset alignment. In the case of glass forming plungers, such deviations may occur, as previously mentioned, due to thermal expansion, vibration, etc.

It is another object of the invention to provide a clamping or movement restraining device for a machine part which permits rapid and facile removal and replacement of such part, if found necessary.

In accomplishing the above objects of the invention there is provided a clamping or movement restraining device which is actuated to its clamping or restraining condition by means of a pressurized fluid supplied thereto and which is maintained in such condition by the continued supply of such fluid to the device. In the event of the desired actuation of the device to an unclamping or unrestraining condition, the pressure of said fluid supplied to the device may be merely relieved or, under some conditions, a negative fluid pressure may be supplied thereto following such relief of pressure.

Other objects and characteristic features of the invention will become apparent as the description proceeds.

Although the use of the inventive mechanism or device is described herein in conjunction with a glass press mold and plunger apparatus, it is not intended that such mechanism be confined to use only with such apparatus but it is to be understood that the invention may be employed in conjunction with any apparatus suitable to the special utility of the clamping or movement restraining mechanism.

The invention will best be understood by reference to the accompanying drawings wherein.

Similar reference characters refer to similar parts in each of the figures of the drawings.

Figure 1:
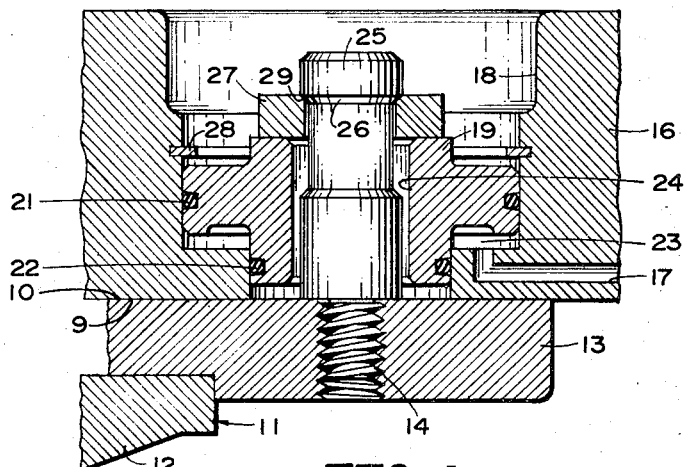
FIG. 1 is a fragmentary sectional view showing a preferred embodiment of the present invention applied to a cross-head support and a glass pressing plunger assembly.
Figure 2:
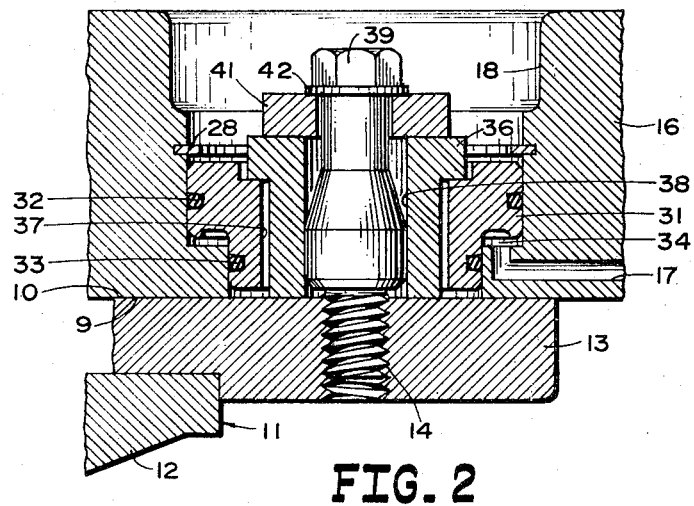
FIG. 2 is a fragmentary sectional view similar to that of FIG. 1 but showing an alternative embodiment of the invention.

Referring to FIGS. 1 and 2 of the drawings in detail, reference 11 designates generally a glass pressing plunger assembly including a plunger 12 and a plunger head 13, such plunger head being provided with a top surface 9 which is complemental to the bottom surface 10 of a cross-head support 16 for said assembly. Plunger head 13 is provided with a threaded orifice 14 which extends therethrough normal to said surface 9 and employed for a purpose hereinafter discussed. Reference 18 designates generally an orifice extending through cross-head support 16 normal to said surface 10 of such support, the bottom portion of such orifice providing, as hereinafter discussed in more detail, a piston housing. Cross-head support 16 is also provided with a fluid conduit 17 comprising a channel or orifice which extends through such support and leads to said orifice 18 in a region near the bottom thereof.

Referring further to FIG. 1, a flanged sleeve or piston 19 is fitted snugly within the lower part of orifice 18 and is provided with annular gaskets 21 and 22 which completely encircle the outer periphery of sleeve 19 in the regions of the sleeve illustrated in FIG. 1. Such gaskets are intended to act as piston rings, as further discussed hereinafter. The threaded end of a connecting pin, such as a bolt 25, is screwed into orifice 14 of plunger head 13 and extends through the hollow 24 extending through sleeve 19. It will be noted that the body portion of bolt 25 has a cross-sectional area somewhat less than that of the hollow 24 in sleeve 19 and, therefore, the bolt may, to some extent, move laterally within such sleeve.

Figure 3:
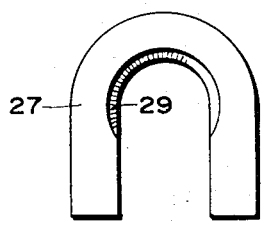
FIG. 3 is a plan view illustrating one of the components employed in conjunction with the preferred embodiment of the invention shown in FIG. 1.

The lower part of the head of bolt 25 is provided with a beveled portion 26 which slopes inwardly and downwardly to the body portion of the bolt as illustrated in FIG. 1. Such beveled portion of the head of the bolt is intended to fit, for the purpose hereinafter discussed, within a complemental bevel portion 29 provided adjacent the inner edge of a U-shaped washer 27 (FIGS. 1 and 3).

In employing the device of FIG. 1 of the drawings, bolt 25, which has previously been threaded into orifice 14 of plunger head 13, is inserted through the hollow 24 of sleeve 19 until the complemental surfaces 9 and 10 of plunger head 13 and cross-head support 16, respectively, are abutted in face-to-face relationship as illustrated in FIG. 1. At such time sleeve 19 is in its lowermost position in orifice 18 of support 16 and, therefore, washer 27 can be laterally inserted beneath the head of bolt 25 until the beveled edge 29 of the washer is beneath the bolt head. Following such insertion of the washer 27, pressurized fluid is supplied to conduit 17 and enters a region 23 of orifice 18, such region surrounding the periphery of sleeve 19 beneath the flanged portion of such sleeve. Such supply of pressurized fluid to region 23 of orifice 18 causes piston-like action of sleeve 19 in the upward direction within orifice 18. Gaskets 21 and 22 aid in confining the pressurized fluid within the lower part of orifice 18, as is readily apparent.

The upward movement of sleeve or piston 19 as described above pushes washer 27 in the upward direction until the beveled part 26 of the head of bolt 25 is firmly seated within the beveled portion 29 provided adjacent the inner edge of washer 27. Following such seating of the bolt head and washer 27, any further upward movement of the washer draws upwardly on bolt 25 and the attached pressing plunger assembly 11, and forces surface 9 of plunger head 13 into tighter contact with its complemental surface 10 of cross-head support 16. The seating of the beveled portions of bolt 25 and washer 27 assure the retention of washer 27 in its inserted position. The apparatus of FIG. 1 is now in the position illustrated in such drawing figure, and the pressing plunger assembly 11 is clamped or held in a preset position in relationship to cross-head support 16 by the continued supply of pressurized fluid to conduit 17 and the resulting frictional sliding resistance existing between surfaces 9 and 10. Such resistance is, of course, proportionate to the pressure of the pressurized fluid supplied to conduit 17 and may be adjusted as desired. If, as previously mentioned, plunger 12 should become misaligned with its cooperating press mold (not shown) due to vibration or thermal expansion, etc., the pressure of the pressurized fluid supplied to conduit 17 can be reduced and the position of pressing plunger assembly 11 can then be laterally readjusted to compensate for such deviations in a preset alignment, the bolt 25 moving laterally within the hollow of piston or sleeve 19 at such time, and surfaces 9 and 10 sliding relative to one another. Following such realignment, the pressure of the fluid to conduit 17 is restored to the higher level to provide for proper clamping action between plunger assembly 11 and cross-head 16.

If for any reason it is found desirable or necessary to remove the pressing plunger assembly 11, as for example for inspection or replacement of plunger 12, the pressurized fluid supplied to conduit 17 is discontinued and, if found necessary, vacuum or fluid under negative pressure may be supplied to such conduit. This will cause actuation of sleeve or piston 19 in its downward direction within of orifice 18 thereby releasing washer 27 for ready removal thereof. After removal of washer 27, bolt 25 and its depending pressing plunger assembly may be readily removed from the cross-head support 16, and then repaired or rapidly replaced with a new assembly. It is pointed out that an annular band 28 is provided around the inner periphery of orifice 18 of cross-head support 16 at a region above the upper limit of movement of sleeve 19 within such orifice. This band overhangs the flange portion of sleeve 19 and prevents accidental ejection of such sleeve from orifice 18 if positive pressurized fluid is inadvertently supplied to orifice 17 while bolt 25 and washer 27 are not in their proper positions as illustrated in FIG. 1.

Referring to the embodiment of the invention illustrated in FIG. 2, the apparatus of such embodiment operates similarly to that of FIG. 1 and includes a flanged sleeve or piston 31 snugly fitted within orifice 18 toward the bottom portion thereof, such sleeve being provided with annular gaskets 32 and 33. A bushing 36 extends through the hollow 37 of flanged sleeve 31, and an enlarged body portion of a connecting pin, such as a bolt 39, snugly fits and extends through the hollow 38 of bushing 36, the threaded end of the bolt being screwed into the complemental threaded orifice 14 provided in plunger head 13. Bushing 36 is provided at the upper end thereof with a flanged portion which overhangs a part of the top rim of sleeve 31. Bolt 39 includes a flange portion 42 which is integral with the head of the bolt, and a U-shaped washer 41, similar to washer 27 of FIGS. 1 and 3 but without the beveled portion 29, is inserted beneath flange portion 42 of bolt 39.

In assembling the apparatus of FIG. 2, bolt 39 is inserted up through the hollow 38 of bushing 36 and washer 41 is laterally inserted around the body of the bolt beneath flange portion 42. Bolt 39 is then further screwed into orifice 14 of plunger head 13 until such plunger head, bushing 36, and washer 41 are drawn together tightly to form a rigidly assembled unit. Pressurized fluid is then supplied to conduit 17 which leads to bottom portion 34 of orifice 18 beneath the flange of piston or sleeve 31. Such pressurized fluid actuates sleeve 31 in the upward direction within orifice 18 as illustrated in FIG. 2 and, similarly to the embodiment of FIG. 1, the complemental surfaces 9 and 10 of plunger head 13 and cross-head support 16, respectively, are thereby drawn into tight contact with each other. The apparatus of FIG. 2 is then operable in a manner similar to that described for the apparatus of FIG. 1, bushing 36 being laterally movable within the hollow 37 of sleeve 31 when the pressure supplied to conduit 17 is sufficiently reduced.

In removing the pressing plunger assembly 11 of FIG. 2 for repair or replacement thereof, the supply of pressurized fluid is removed from conduit 17, and piston or sleeve 31 moves to its downward position within orifice 18. Such action also lowers bushing 36, washer 41 and bolt 39, thereby separating surfaces 9 and 10. Bolt 39 is then unscrewed at least part of a turn to free washer 41 which is then removed. Bolt 39 can then be readily lowered through the hollow 38 of bushing 36, and the pressing plunger assembly 11 thereby removed from cross-head support 16. If found necessary or desirable, negative pressurized fluid can be supplied to conduit 17, following the removal of the supply of positive pressurized fluid thereto, to assist in the downward movement of sleeve 31 within orifice 18.

It is pointed out in the embodiment of FIG. 2 that an annular band 28 is provided around the inner periphery of orifice 18 at a region above the upper limit of movement of sleeve 31 within such orifice. This band performs the same function as the identical band 28 provided in the embodiment of the invention illustrated in FIG. 1 of the drawings.

It will be readily understood by those skilled in the art that, in actual practice, when a clamping device such as herein disclosed is employed in conjunction with a glass forming machine of the press mold and plunger type, each of the bang-up bolts normally employed is replaced by one of the clamping devices and, in the realignment or replacement of a plunger assembly, all such clamping devices associated with such assembly are actuated in the manner described.

Although there is herein illustrated and described only two embodiments of the present invention, it is to be understood that various changes and modifications may be made therein without departing from the spirit and scope of the appended claims.

What is claimed is:

1. In combination with a cylindered body member 16 and a slidable contact member 13 with such body member, (A) a hollow type piston 19 or 31 within said body member, (B) a headed piston rod 25 or 39 secured to said contact member and extending through the hollow 24 or 37 in said piston, (C) means 27, or 36 and 41 for detachably coupling the head of said piston rod with said piston, and (D) means including at least one conduit 17 for supplying pressurized fluid to said body member to actuate said piston to draw said contact member into contact with said body member.

2. Apparatus in accordance with claim 1 and in which said body member and said contact member are a crosshead support and a plunger head, respectively, of a glass forming machine, and in which said coupling means comprises a U-shaped washer 27 inserted between said head of said piston rod and said piston.

3. Apparatus in accordance with claim 1 and in which said body member and said contact member are a crosshead support and a plunger head, respectively, of a glass forming machine, and in which said coupling means includes a flanged bushing 36 surrounding the outer periphery of said piston rod and a U-shaped washer 41 inserted between the flange of such bushing and said head of such piston rod.

References Cited
UNITED STATES PATENTS

| | | | |
|---|---|---|---|
| 1,342,056 | 6/1920 | Miller | 65—323 XR |
| 1,670,821 | 5/1928 | Pawling et al. | 65—363 XR |
| 2,186,174 | 1/1940 | Pearson | 65—362 XR |

S. LEON BASHORE, *Acting Primary Examiner.*

DONALL H. SYLVESTER, *Examiner.*

F. W. MIGA, *Assistant Examiner.*